United States Patent [19]

Tanaka et al.

[11] Patent Number: 5,088,041
[45] Date of Patent: Feb. 11, 1992

[54] REGENERATIVE BRAKING SYSTEM FOR CAR

[75] Inventors: Koji Tanaka; Takashi Shima, both of Tokyo, Japan

[73] Assignee: Isuzu Motors Limited, Tokyo, Japan

[21] Appl. No.: 424,825

[22] Filed: Oct. 20, 1989

[30] Foreign Application Priority Data

Oct. 27, 1988 [JP] Japan .................. 63-271529

[51] Int. Cl.$^5$ .............................................. B60K 17/00
[52] U.S. Cl. .................. 364/426.01; 364/424.1; 180/165; 74/866
[58] Field of Search .............. 180/165; 364/426.01, 364/424.1, 424.01; 60/413–418; 74/856, 860, 865, 866

[56] References Cited

U.S. PATENT DOCUMENTS

| | | | |
|---|---|---|---|
| 4,382,484 | 5/1983 | Anderson et al. | 60/413 |
| 4,821,190 | 4/1989 | Patil | 364/424.1 |
| 4,855,914 | 8/1989 | Davis et al. | 364/424.1 |
| 4,928,227 | 5/1990 | Burba et al. | 364/424.01 |
| 4,937,750 | 6/1990 | Gilliam | 364/424.1 |

FOREIGN PATENT DOCUMENTS

| | | |
|---|---|---|
| 61-175150 | 8/1986 | Japan . |
| 61-175151 | 8/1986 | Japan . |
| 61-175152 | 8/1986 | Japan . |
| 61-175153 | 8/1986 | Japan . |
| 61-175154 | 8/1986 | Japan . |
| 62-15128 | 1/1987 | Japan . |
| 62-18325 | 1/1987 | Japan . |
| 62-18326 | 1/1987 | Japan . |
| 62-31522 | 2/1987 | Japan . |
| 62-31523 | 2/1987 | Japan . |
| 62-34819 | 2/1987 | Japan . |
| 62-37216 | 2/1987 | Japan . |
| 62-37217 | 2/1987 | Japan . |
| 62-37218 | 2/1987 | Japan . |

OTHER PUBLICATIONS

1979 Society of Automotive Engineers, Inc., "Improvement of Citybus Fuel Economy Using a Hydraulic Hybrid Propulsion System—A Theoretical and Experimental Study", by P. Buchwald et al., pp. 1-15.
1985 Society of Automotive Engineers, Inc., "Predicting the Retardation Performance of Vehicles Equipped with Hydro-Pneumatic Energy Storage System", by Anthony S. Davies et al., pp. 2.516-2.523.
1985 Society of Automotive Engineers, Inc., "Studies of an Accumulator Energy-Storage Automobile Design with a Single Pump/Motor Unit", by S. Tollefson et al., pp. 1-9.
1985 Society of Automotive Engineers, Inc., "Fuel Economy and Operating Characteristics of a Hydropneumatic Energy Storage Automobile", Peirong Wu et al., pp. 1-10.
Automotive Engineering, vol. 92, No. 10, Oct. 1984, *International Viewpoints*, "Regenerative Braking for Buses Gives Fuel Saving", by David Scott and Jack Yamaguchi, pp. 95-99.
Commercial Motor, Jan. 24, 1987, *Brakes Developments*, "Braking New Ground", pp. 35-36.
"Cumulo Bus for London", Dec. 1985, p. 537.
Automotive Engineering, vol. 87, No. 10, Oct. 1979, *International Viewpoints*, "Regenerative Braking Cuts Bus Fuel Needs", by David Scott, pp. 102-107.
University of Queensland, May 1984, Department of Mechanical Engineering, (Drawing of FIG. 4) "Optimisation of a Regenerative Energy Storage System for a 10 Tonne Bus", by M. K. Vint, pp. 1-9.
University of Queensland, Aug. 1986, Department of Mechanical Engineering, "Overview of the Design and Installation of a Regenerative Braking, Storage and Propulsion System for a Leyland Panther Bus", by M. K. Vint, pp. (i)-5.

Primary Examiner—Thomas G. Black
Attorney, Agent, or Firm—Staas & Halsey

[57] ABSTRACT

A regenerative braking system for a car in which a driving torque required for the car is determined according to the sensed positions of an accelerator pedal and the gear. The motoring capacity of a pump/motor is determined based on the determined driving torque and the sensed pressure of a hydraulic oil circuit including the pump/motor, while the engine of the car is decoupled or coupled as necessary. An electromagnetic clutch is coupled to a power take-off unit and the pump/motor, and the hydraulic oil circuit is closed with the pump/motor being controlled to have the determined motoring capacity in the accelerating mode of the car.

7 Claims, 15 Drawing Sheets

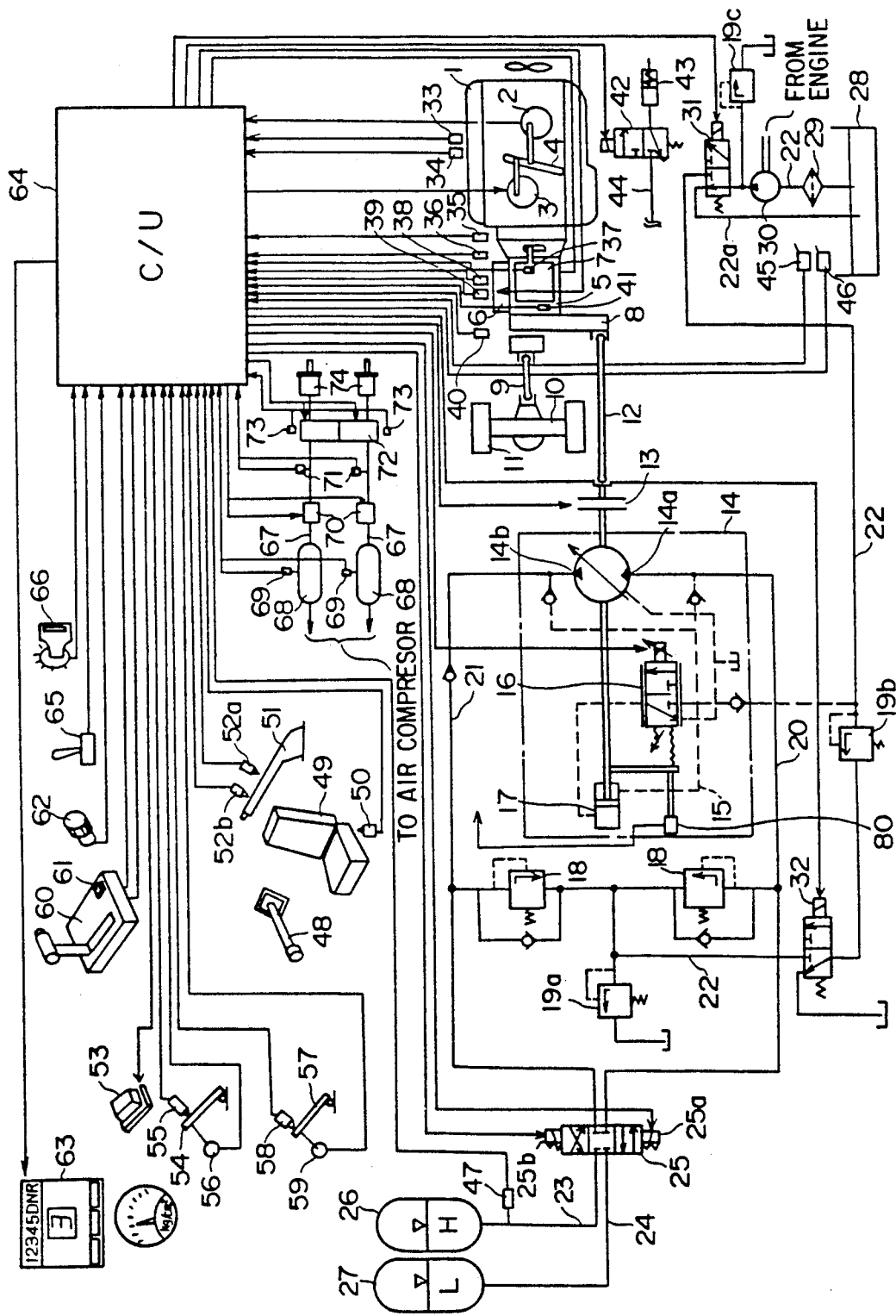

FIG. 12

FLAG FL_SPEED

| BIT | INDICATED CAR SPEED |
|---|---|
| b 0 | SET AT STOPPAGE |
| b 1 | SET WHEN $V \leq 2$ Km/h |
| b 2 | SET WHEN $2$ Km/h $< V \leq 10$ Km/h |
| b 3 | SET WHEN $10$ Km/h $< V \leq 20$ Km/h |
| b 4 | SET WHEN $20$ Km/h $< V \leq 30$ Km/h |
| b 5 | SET WHEN $30$ Km/h $< V \leq 40$ Km/h |
| b 6 | SET WHEN $40$ Km/h $< V \leq 50$ Km/h |
| b 7 | SET AT 50 Km/h |

FIG. 13

FLAG FL_RBS

| BIT | SET CONDITION | RESET CONDITION |
|---|---|---|
| b0 | AT ENTRANCE INTO ENERGY RECOVERY MODE | AT ENTRANCE INTO OTHER MODES |
| b1 | AT ENTRANCE INTO ENERGY REGENERATIVE MODE | |
| b2 | AT ENTRANCE INTO CONVENTIONAL BRAKE CONTROL MODE | |
| b3 | AT REQUIRING CLUTCH TO BE DECOUPLED | AT ENABLING CLUTCH TO BE COUPLED |
| b4 (PWR1) | UNDER HYDRAULIC ACCELERATION ENABLING CONDITION | UNDER HYDRAULIC ACCELERATION DISABLING CONDITION |
| b5 (PWR2) | AT DETERMINATION OF Po (HYDRAULIC ACCELERATION STARTED) | AT NON-DETERMINATION OF Po (HYDRAULIC ACCELERATION YET) |
| b6 (FO) | FADE-OUT START | FADE-OUT HALT |
| b7 | | |

FIG. 14

FLAG FL_PEDAL

| BIT | 0 | 1 | RESET CONDITION |
|---|---|---|---|
| b0 (BRK1) | NEW ENERGY RECOVERY CONTROL | CONTROL LATER THAN 2ND | CONVENTIONAL BRAKE CONTROL/AT THE HEAD OF ENERGY REGENERATIVE CONTROL |
| b1 (BRK2) | UNNECESSARY BRAKING | NECESSARY BRAKING | |
| b2 (ACC1) | NEW ENERGY REGENERATIVE CONTROL | CONTROL LATER THAN 2ND | CONVENTIONAL BRAKE CONTROL/AT THE HEAD OF ENERGY RECOVERY CONTROL |
| b3 (ACC2) | | | |

REGENERATIVE BRAKING SYSTEM FOR CAR

CROSS REFERENCE TO RELATED APPLICATIONS

This application is related to U.S. application Ser. Nos. 07/424,552, filed Oct. 20, 1989; 07/424,554, filed Oct. 20, 1989; 07/424,727, filed Oct. 20, 1989; and 07/424,723, filed Oct. 20, 1989, all of which are assigned to the assignee of the subject application.

BACKGROUND OF THE INVENTION

The present invention relates to a regenerative braking system for a car, and particularly to a regenerative braking system for a car wherein the decelerating energy of a car is captured and used for the starting/accelerating energy.

In a PTO (Power-take-off) output unit (system) or a deceleration energy recovery system as conventionally known, a part of the kinetic energy dissipated mainly as heat at a brake or engine during the deceleration of a car is captured in the form of hydraulic operating oil and accumulated in an accumulator. The accumulated energy is utilized for the starting energy and accelerating energy of the car.

For example, in 1976 C. J. Lorence Corporation in England announced the development of such a system using a bus of British Leyland Corporation. Since then, various research and development has been conducted in Europe.

Recently, Japanese Patent Application Laid-open Nos. 62-15128, 62-37215, and 62-39327 have disclosed a deceleration energy recovery system which is essentially formed of a transmission (hereinafter referred to as T/M), a multi-stage gear-changed PTO unit, a PTO output shaft, a pump/motor, a hydraulic oil circuit, an electromagnetic clutch, an accumulator, and a control unit.

The T/M includes a counter shaft driven through an engine clutch, a main shaft connected to a wheel driving line, and a multi-staged gear train mechanism transferring the rotation of the counter shaft to the main shaft through the gears. The multi-stage gear-changed PTO unit includes a counter shaft PTO gear disconnectably coupled to the counter shaft through a counter shaft PTO gear synchronizer, a main shaft PTO gear coupled to the counter shaft PTO gear and disconnectably coupled to the main shaft through a main shaft PTO gear synchronizer, and a PTO output shaft driven through driving gears coupled to the main shaft PTO gear. The pump/motor is coupled to the PTO output shaft, the hydraulic oil circuit consists of a high pressure oil line and a low pressure oil line and serves to connect the accumulator to an oil tank through the pump/motor, and the electromagnetic clutch serves to connect/disconnect the oil circuit to/from the PTO shaft.

The control unit controls the electromagnetic clutch and works the pump/motor as either a pump or a motor in response to the running condition of the car. Namely, for working the pump/motor as a pump, the torque of the wheels during the decelerating mode serves to accumulate the operating oil into the accumulator through the PTO unit, thereby to capture the kinetic energy, i.e. braking energy mainly lost as heat in the brake or engine, and for working the pump/motor as a motor, the operating oil accumulated in the accumulator serves to generate starting/accelerating torque to drive the wheels through the PTO unit.

The control manner of this control unit is as follows:
① When the car starts with the inner pressure of the accumulator being sufficient, the pump/motor is controlled to serve as a variable capacity type motor, the capacity of which is controlled by varying the displacement angle (incline angle) of the swash plate or shaft in response to the accelerator pedal positions.

Since the pump/motor is also connected to the electromagnetic clutch, when the electromagnetic clutch is coupled to the PTO unit by the control unit, the pump/motor drives the car based on the hydraulic power accumulated in the oil circuit.

In the meantime, when the car speed exceeds a preset value corresponding to the gear position selected by a driver, the engine clutch is coupled to the engine for the engine cruising. At the same time the PTO unit is gear-changed so as to turn off the counter shaft synchronizer which was on, and turn on the main shaft synchronizer which was off, and the combined cruising of the pump/motor with the engine is carried out according to the hydraulic power based on the pedal position only if the accelerator pedal is largely operated by the foot.

② During the braking mode, the electromagnetic clutch is made on, and the displacement angle control signal (pump capacity control signal) according to the brake pedal position is supplied to the pump/motor for the corresponding pumping operation, while at the same time the engine is declutched.

Thus, the control unit controls the engine clutch to decouple the engine from the driving line of the wheels in order to capture a part of the braking energy which is to be consumed in the engine during the braking mode and to relieve the captured energy during the accelerating mode, while coupling the engine to the driving line in order to use the engine power solely or in combination with the motor during the starting/accelerating mode.

Furthermore, in a case where the output of the engine is combined with the motoring output of the pump/motor, the control unit serves to supply an amount of fuel corresponding to the position of the acceleration pedal, to the engine, which drives the wheels. When the position of the accleration pedal exceeds the predetermined value, the control unit controls the pump/motor to vary its capacity as a motor in proportion to the pedal position, whereby the power generated by the motor is added to the drive line of the wheels.

Therefore, it is disadvantageous that the sum of the outputs of the engine and the motor can not be fixed because the output of the motor is varied due to the variation of the inner pressure of the accumulator, even when the position of the acceleration pedal is fixed.

SUMMARY OF THE INVENTION

It is accordingly an object of the present invention to provide a regenerative braking system for a car which can furnish a fixed driving power at any time in response to the position of the acceleration pedal.

According to the present invention, as conceptually shown in FIG. 1A, control means 64 in the energy regenerative mode of hydraulic starting or hydraulic cruising determines necessary torque, for driving the car, based on the position of an acceleration pedal, which is sensed by sensing means for sensing the position of the acceleration pedal and based on the present gear position sensed by sensing means for sensing the gear position.

The control unit 64 determines the motoring capacity (displacement angle) of a pump/motor 14 (which forms a hydraulic oil circuit together with a high pressure accumulator 26, a circuit valve 25, a pump/motor 14, and a low pressure accumulator 27), from the determined motoring torque and the oil pressure of the hydraulic circuit sensed by a pressure sensing means 47 for the hydraulic circuit. The control unit 64 controls the pump/motor 14 to have the motoring capacity.

At the same time, the control means 64 controls the hydraulic circuit to the energy regenerative mode for the cruising energy as shown, so that the oil of the high pressure accumulator 26 may be discharged through the circuit valve 25 and the pump/motor 14 to the low pressure accumulator 27, and the control means 64 couples an electromagnetic clutch 13 between a PTO unit 8 and the pump/motor 14 to effect the hydraulic cruising.

Accordingly, the present invention always generates an optimum driving force corresponding to the torque based on the acceleration pedal position and the inner pressure of the hydraulic circuit, whereby a feeling similar to a conventional car is given to a driver.

BRIEF DESCRIPTION OF THE DRAWINGS

The present invention will be more apparent to those skilled in the art, from the following drawings in which:

FIG. 1B is a block diagram of an embodiment of a regenerative braking system for a car in accordance with the present invention;

FIG. 12 is a chart for explaining flag FL-SPEED;

FIG. 13 is a chart for explaining flag FL-RBS;

FIG. 14 is a chart for explaining flag FL-PEDAL; and,

Throughout the figures, the same reference numerals indicate identical or corresponding portions.

DETAILED DESCRIPTION OF THE PREFERRED EMBODIMENTS

There will now be described the embodiments of a regenerative braking system for a car according to the present invention.

Figure 1A:
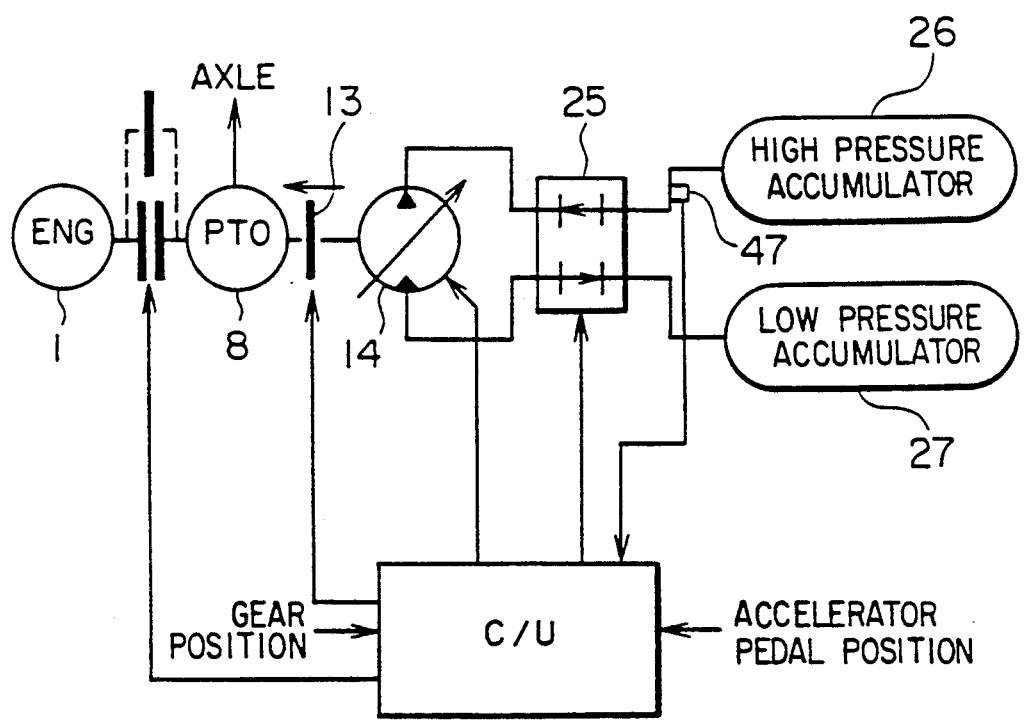
FIG. 1A is a conceptual diagram of a regenerative braking system for a car in accordance with the present invention.

Referring now to FIG. 1B, this overall arrangement of the regenerative braking system (hereinafter referred to as RBS) includes; an engine 1; a load sensor 2 for the engine 1; a step motor 3 responsive to the position of an accelerator pedal 54; an injection pump lever 4 which is controlled by the step motor 3 to set the fuel supply into the engine 1 and is connected to the load sensor 2; a T/M (gearbox) 5 which provides, as an output, the changed rotation of the engine 1; a gear shift actuator 6 which automatically changes the gear ratio of the T/M 5; a clutch actuator 7 which automatically couples/decouples the engine clutch (not shown); a PTO unit 8 connected to the T/M 5; a propeller shaft 9 forming the driving line for wheels 11 together with an axle 10; a PTO shaft 12 of the PTO unit 8; an electromagnetic clutch 13; a well-known pump/motor 14 of a variable capacity swash plate type which is connected to the PTO unit 8 through the PTO shaft 12 and the electromagnetic clutch 13, and is combined with a displacement (incline) angle controlling pilot piping 15, a displacement angle controlling electromagnetic proportional valve 16, and a displacement angle controlling piston 17, and which has a suction port 14a and a discharge port 14b; and a displacement angle sensor 80 for sensing the displacement angle of the pump/motor 14.

Figure 2A:
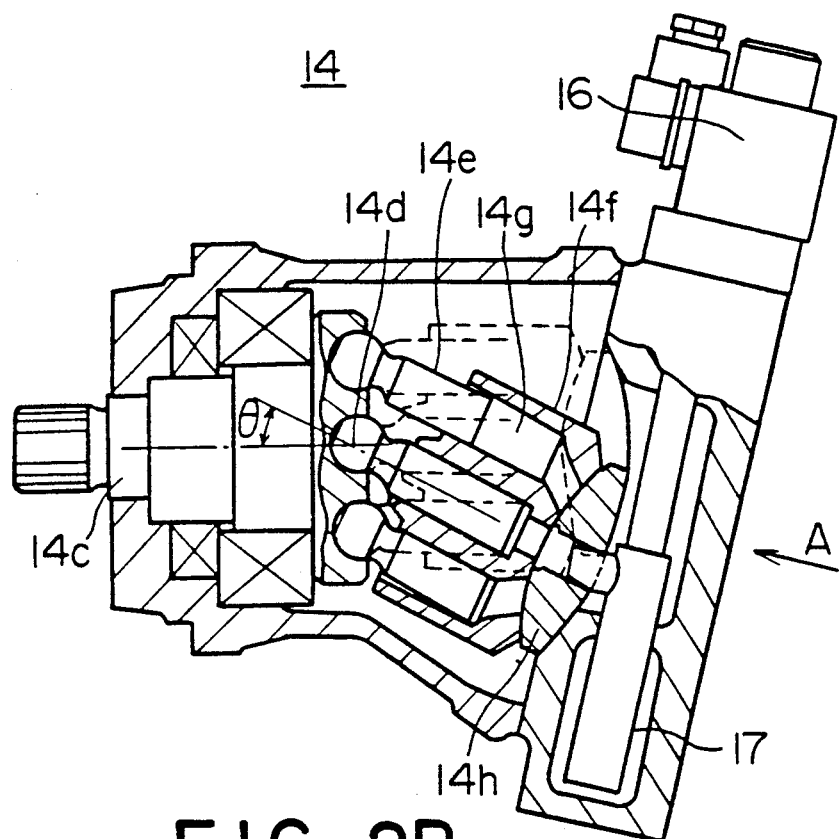
FIGS. 2A and 2B are respectively a sectional view and a perspective view of a swash shaft type pump/motor used for the present invention.
Figure 2B:
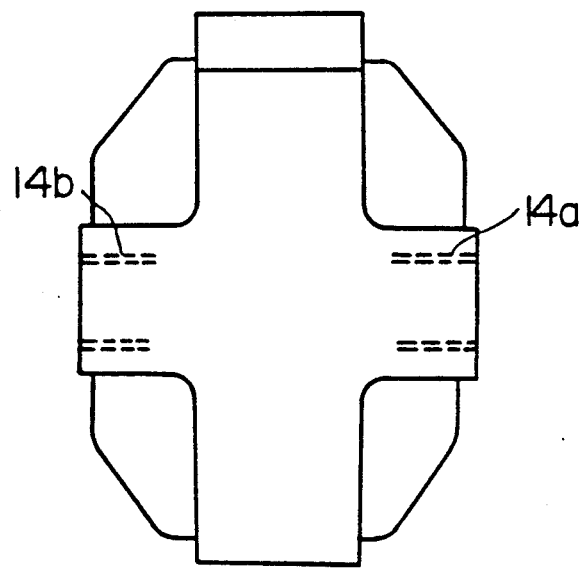

Now describing the pump/motor 14 on the basis of FIG. 2A and FIG. 2B seen from the direction by arrow A in FIG. 2A, a shaft 14d connected to an output shaft 14c is inserted into the central aperture of a cylinder block 14f, the opposite side of which is connected to the piston 17 through a port plate 14h. Also, the cylinder block 14f is provided at the periphery with a plurality of cylinders 14g each having one end slidably inserted with pistons 14e connected to the output shaft 14c and another end connected through the port plate 14h to the suction port 14a or the discharge port 14b shown in FIG. 2B.

The piston 17 as above noted is movable in the up-/down direction by the pressure of the operating oil supplied to the lower portion of the piston 17 from the pilot piping 15 or the operating oil within the oil pipings 20, 21 in proportion to the controlling current supplied to the electromagnetic proportional valve 16. Therefore, the assembly consisting of the cylinder block 14f, the piston 14e, the shaft 14d, and the port plate 14h varies its angle in accordance with the up/down movement of the controlling piston 17 connected to the output shaft 14c, where the angle $\theta$ formed by the output shaft 14c and the shaft 14d is called the above noted displacement angle.

FIG. 2A shows the case where the electromagnetic proportional valve 16 is supplied with the maximum control current, which provides the maximum displacement angle whereby the discharge amount per revolution of the output shaft 14c leads to the maximum. In the case where the electromagnetic proportional valve 16 has null control current therein, the displacement angle becomes null as shown by the dotted line, which leads to a null discharge amount.

Back to FIG. 1B, the RBS futher includes; a high pressure relief valve 18 for relieving the accumulation of a high pressure accumulator 26 which will be hereinafter mentioned, when it exceeds a set value; a low pressure relief valve 19a for relieving the supply pressure of the operating oil of a replenishing circuit when it exceeds a set value; a low pressure relief valve 19b for creating pilot pressure required for displacing the capacity of the pump/motor 14 into the pilot piping 15; a piping 20 on the suction side of the pump/motor 14; a piping 21 on the discharge side of the pump/motor 14; a replenishing piping 22 for the operating oil; a return piping 22a for the operating oil; a high pressure side piping 23; a low pressure side piping 24; a circuit change-over valve 25 for changing over the above pipings 20~24; a high pressure accumulator 26 connected to the circuit change-over valve 25 through the high pressure side piping 23; and a low pressure accumulator 27 which is connected to the circuit change-over valve 25 through the low pressure side piping 24 and forms a hydraulic oil circuit together with the above pump/motor 14, the circuit change-over valve 25, and the high pressure accumulator 26.

It is to be noted that the circuit change-over valve 25 is necessary for changing over the pumping mode to the motoring mode with the suction/discharge port of the pump/motor 14 being unchanged, and can be replaced by a circuit shut-off valve if the pump/motor 14 is of a reversible type. The circuit change-over valve and circuit shut-off valve can be generally called a circuit valve.

Referring to the change-over operation of the pipings by the circuit change-over valve 25, when neither of the electromagnets 25a and 25b is excited, the valve 25 takes the position shown in the central portion in FIG. 1B from among three valve positions, for the isolation between four pipings 20, 21, 23, and 24.

To recover the braking energy, the electromagnet 25a is excited to change-over the valve position to the side of the electromagnet 25a. Then, the low pressure accumulator 27 can be interconnected with the suction port 14a of the pump/motor 14 through the pipings 24, 20 and the high pressure accumulator 26 can be interconnected with the discharge port 14b of the pump/motor 14 through the pipings 23, 21. Accordingly, the operating oil accumulated in the low pressure accumulator 27 is pumped by the pump/motor 14 working as a pump driven by the braking energy, and is accumulated into the high pressure accumulator 26.

On the contrary, to work the pump/motor 14 as a motor, the electromagnet 25b of the circuit change-over valve 25 is excited to change-over the valve to the position on the side of the electromagnet 25b. Then, the low pressure accumulator 27 can be interconnected with the discharge port 14b of the pump/motor 14 through the pipings 24, 21 and the high pressure accumulator 26 can be interconnected with the suction port 14a of the pump/motor 14 through the pipings 23, 20. As a result, the operating oil accumulated in the high pressure accumulator 26 passes through the pipings 23, 20 to rotate the pump/motor 14 as a motor, and then passes through the pipings 21, 24 to reach the low pressure accumulator 27 for the accumulation therein.

The RBS in FIG. 1B further includes: a drain tank 28 and a filter 29 for the operating oil; a replenishing pump 30 for the operating oil driven by the engine 1; electromagnetic valves 31 and 32 which are provided on the replenishing piping 22, supply the operating oil returned to the drain tank from the hydraulic oil circuit to the hydraulic oil circuit, and supply the pilot oil pressure through the pilot piping 15 to the pump/motor 14.

Furthermore, there are provided: a directly coupled cooling relay switch 33; a water coolant temperature sensor 34 for the engine 1; a rotational speed sensor 35 for the engine 1; a rotational speed sensor 36 for the input shaft; a clutch stroke sensor 37 for the T/M 5; a gear position sensor 38; a gear-shift stroke sensor 39; a car speed sensor 40 as a car speed sensing means; an oil temperature sensor 41 for the T/M 5; an exhaust brake control valve 42; a cylinder 43 for driving an exhaust brake valve (not shown); an air piping 44 for supplying air pressure for the cylinder 43 through the exhaust brake control valve 42; and limit switches 45 and 46 provided in the drain tank 28 to detect the drain quantity; a pressure sensor 47 for sensing the pressure of the operating oil accumulated in the high pressure accumulator 26. It is to be noted that the gear position sensor 38 and the gear-shift stroke sensor 39 form gear position sensing means.

Finally, there are provided: a hand lever 48 for actuating exhaust braking; a driver's seat 49; an off-seat detection switch 50 for detecting whether or not the driver has left the driver's seat 49; a parking brake lever 51; a parking brake switch 52a and 52b; a main switch 53 for the RBS; an accelerator pedal 54; an idle position detecting switch 55; an accelerator pedal position sensor 56; a brake pedal 57, a brake pedal return position detecting switch 58 (hereinafter simply referred to as a brake pedal switch); a brake pedal position sensor 59 which can also serve as a brake pedal switch; a gear selection lever 60; a switch 61 of a hill-start-aid apparatus (hereinafter referred to as HSA); an idle control switch 62; an indicator group 63; a door switch 65; a key switch 66; a brake air piping 67; a brake air tank 68; a brake air pressure sensor 69; an electromagnetic proportional pressure control valve 70; air pressure switches 71 and 73; an HSA valve 72; an air master cylinder 74; and a control unit 64 (hereinafter referred to as C/U) as control means for controlling the pump/motor 14 and the above noted various actuators on the basis of the outputs of the above noted sensors and switches to recover the braking energy. It is to be noted that C/U 64 includes a memory (not shown) for storing programs, maps, and flags which will be mentioned.

Figure 3:
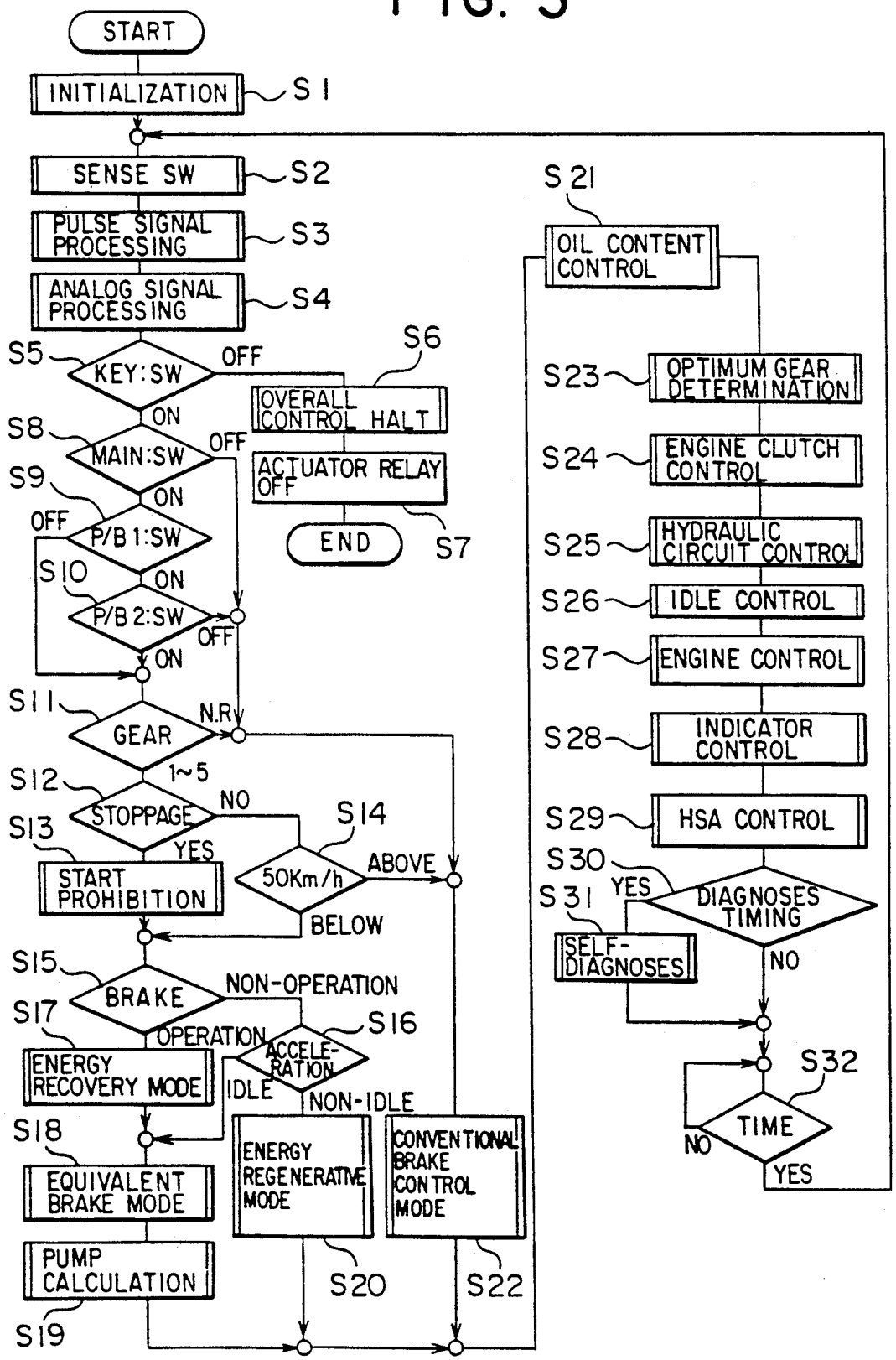
FIG. 3 is a flow chart of an entire program stored in and executed by control means according to the present invention.

FIG. 3 shows an overall program flow chart stored in and executed by the C/U 64 shown in FIG. 1, based on which the operation of the embodiment shown in FIG. 1 will be described.

Starting the program, the C/U 64 executes an intialization subroutine in which all of the outputs are reset and a RAM (not shown) included therein is also reset (FIG. 3, step S1).

Figure 15:
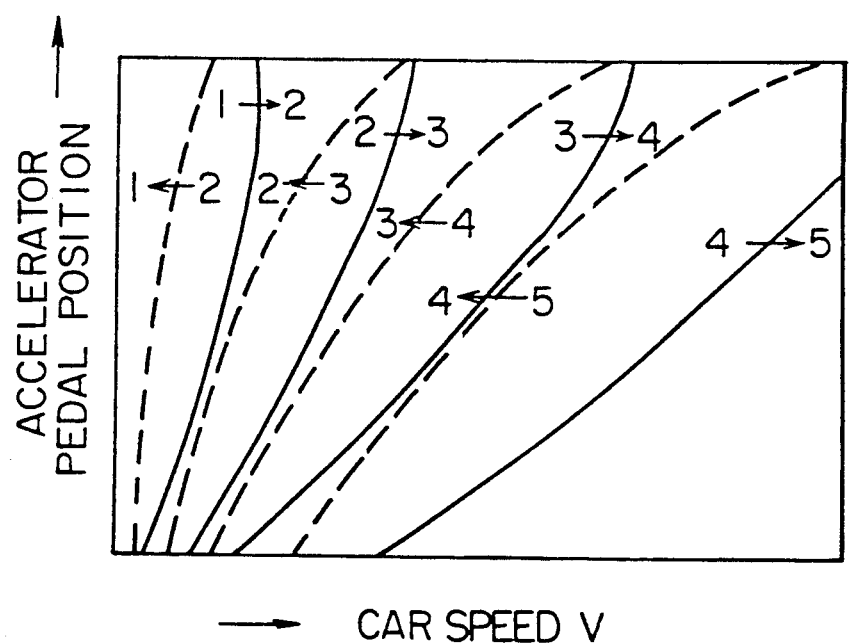
FIG. 15 is a known gear shift map based on car speed and accelerator pedal position.

After the execution of the initialization, a subroutine for reading the signals from the above noted switches 33, 45, 46, 50, 52a and 52b, 53, 55, 58, 61, 62, 65, 66, 71 and 73 as well as the sensor 38, is executed (step S2). Then a processing subroutine for the rotational signal (pulse) read from the sensors 35, 36, and 40 is executed to calculate the engine rotational speed, the input shaft rotational speed and the car speed (step S3). This step creates flags FL-SPEED corresponding to the car speed as shown in FIG. 15 which will be described below.

Then, a processing subroutine for analog signals read from the sensors 2, 34, 37, 39, 41, 47, 56, 59, 69 is executed to determine, in digital form, the engine load, the clutch stroke, the shift stroke, the oil temperature, the oil pressure, the acclerator pedal position, the brake pedal position, and the brake air pressure (step S4).

Data obtained by the reading operations and the processing of these signals is updated each C/U processing period. Also, flags (hereinafter mentioned) are set based on the signals as read and processed in those subroutines.

Next, it is checked whether or not the key switch 66 is on (step S5), where and if it is off, an overall control halt subroutine will be executed (step S6). This subroutine stops the overall control by the interruption of the electric power of the C/U 64 with the acutuator relay (not shown) being made off in step S7 after the hydraulic oil system has completely resumed its safe condition, for the sake of safety even if the key switch 66 is made off in the stopping or running mode.

If it is found in step S5 that the key switch 66 is on, it is then checked whether or not the RBS main switch 53 is on (step S8), and if it is off, a conventional brake control mode subroutine as will be mentioned below is executed (step S22). If it is on, the control will be continued assuming that the driver intends to carry out the operation of the RBS.

Namely, the C/U 64 checks whether or not the driver operates the parking brake 51. In this case, if the parking brake is not operated, and therefore the parking brake switch 52a (P/B1) is off (step S9), the program proceeds to step S11 since the RBS is operable. However, if the parking brake 51 is operated and therefore the parking brake switch 52a (P/B1) is on, the program proceeds to the conventional brake control mode (step S22) (if parking brake switch 52b is off as described below), where the RBS is prohibited from being used. This is because the car should not be started even if the accelerator pedal 54 is carelessly operated by the foot under the condition that the parking brake lever 51 is actuated.

On the other hand, it is checked whether or not another parking brake switch 52b is on for determining the transfer of the output torque of the pump/motor 14 to the car wheels 11 in the motoring mode with the parking brake acting in the hill start mode (step S10).

It is to be noted that the parking brake switch 52b (P/B2) is rendered on only when the knob 51a of the parking brake lever 51 is depressed, as shown in FIG. 14. Namely, the condition that the knob 51a is depressed indicates the intention of the relief of the parking brake, so that the RBS should be operable even if the parking brake lever 51 is operated by hand while the parking brake switch 52a is on.

Next, the C/U 64 checks the selected gear position by means of the gear position sensor 38 and the gear shift stroke sensor 39 (step S11). If the gear position indicates N (neutral) or R (reverse), the program proceeds to the conventional brake control mode subroutine (step S22) without the control operation of the RBS. If the gear position indicates the 1st~5th gear, the RBS is usable, so that the program continues the control operation of the RBS.

Then, it is checked from the output of the car speed sensor 40 whether or not the car has stopped (step S12), and if the car is cruising, the program proceeds to step S14 to check whether or not the present car speed exceeds the permissible rotational speed of the pump/motor 14. This permissible rotational speed can be replaced by a car speed if the gear ratios of the PTO unit 8 and the axle 10 are fixed, because the pump/motor 14 is connected to the wheels through the electromagnetic clutch 13, the PTO shaft 12, the PTO unit 8, the propeller shaft 9 and the axle 10. Therefore, the permissible speed of the RBS is considered to be e.g. 50 km/h based on the multiplication of the permissible rotational speed of the pump/motor 14 with the gear ratio and the circumferential length of the wheels.

In step S14, if it is found that the car speed is lower than 50 km/h, or within the permissible speed of the pump/motor 14, the control operation of the RBS continues, while if it is found that the car speed exceeds the permissible speed, the conventional brake control mode subroutine in step S22 will be executed. It is to be noted that whenever this subroutine (step S22) is excecuted, the bit 2 of the flag FL-RBS in FIG. 16 is set to "1".

In step S12, if it is found that the car has stopped, a start prohibition subroutine will be executed (step S13). This subroutine is limited to the case where the car is a bus, and prohibits the hydraulic oil circuit from working when the bus opens its door. Namely it is executed so as to prohibit the bus from starting for the sake of passengers' safety, assuming that the passengers are getting on/off while the door is open, even if the accelerator pedal is carelessly operated by the foot.

Next, the C/U 64 checks the driver's brake pedal operation (step S15) and acceleration pedal operation is sequence (step S16), the respective pedal indicative signals having been processed in the analog signal processing subroutine in step S4. The reason why the checking step for braking has a priority to that of acceleration is that the braking mode should have a priority for the safety's sake of the car in case of the simultaneous operation of the brake pedal 57 and the acceleration pedal 54.

If it is found in step S15 that the brake pedal 57 is operated by the foot, an energy recovery mode subroutine will be executed (step S17).

In this subroutine, with low car speed (e.g. below 10 km/h) on such occasions as traffic jams where braking is frequently performed, the hydraulic controls become frequent correspondingly, so that for the reduction of the frequency of the use of the hydraulic system, braking torque required in response to the position of the brake pedal 57 is determined from a torque map (not shown) only when the car speed is above a predetermined value and is stored.

After this energy recovery mode subroutine has been thus executed, the C/U 64 executes an equivalent (substitute) brake mode subroutine (FIG. 3, step S18). This subroutine is used to produce braking power equivalent to exhaust braking power or engine braking power.

The exhaust braking is auxiliary braking triggered by the hand lever 48 (or switch) provided at the driver's seat without operating the brake pedal 57, and the engine braking is also auxiliary braking for generating braking power as an engine load.

This subroutine performs the substitute control of the two auxiliary brakings as above noted by declutching the engine (see step S242 in FIG. 7) from the drive line of the wheels 11 in order to recover as much as possible the kinetic energy which the car has in the energy recovery mode.

In other words, braking force alternatively generated in those two auxiliary braking modes is substituted by the pump/motor 14.

As seen in FIG. 3, to the above equivalent braking subroutine in step S18 the program proceeds from the subroutine in step S17 if the brake pedal 57 is operated by the foot or from the subroutine in step S16 if the acceleration pedal 54 is not operated, i.e., if the acceleration pedal is positioned at the idle position.

This equivalent brake mode subroutine (step S18) has nothing to do with the brake pedal operations such as in step S17 because of the substitute mode of auxiliary braking produced by the engine.

Figure 4:
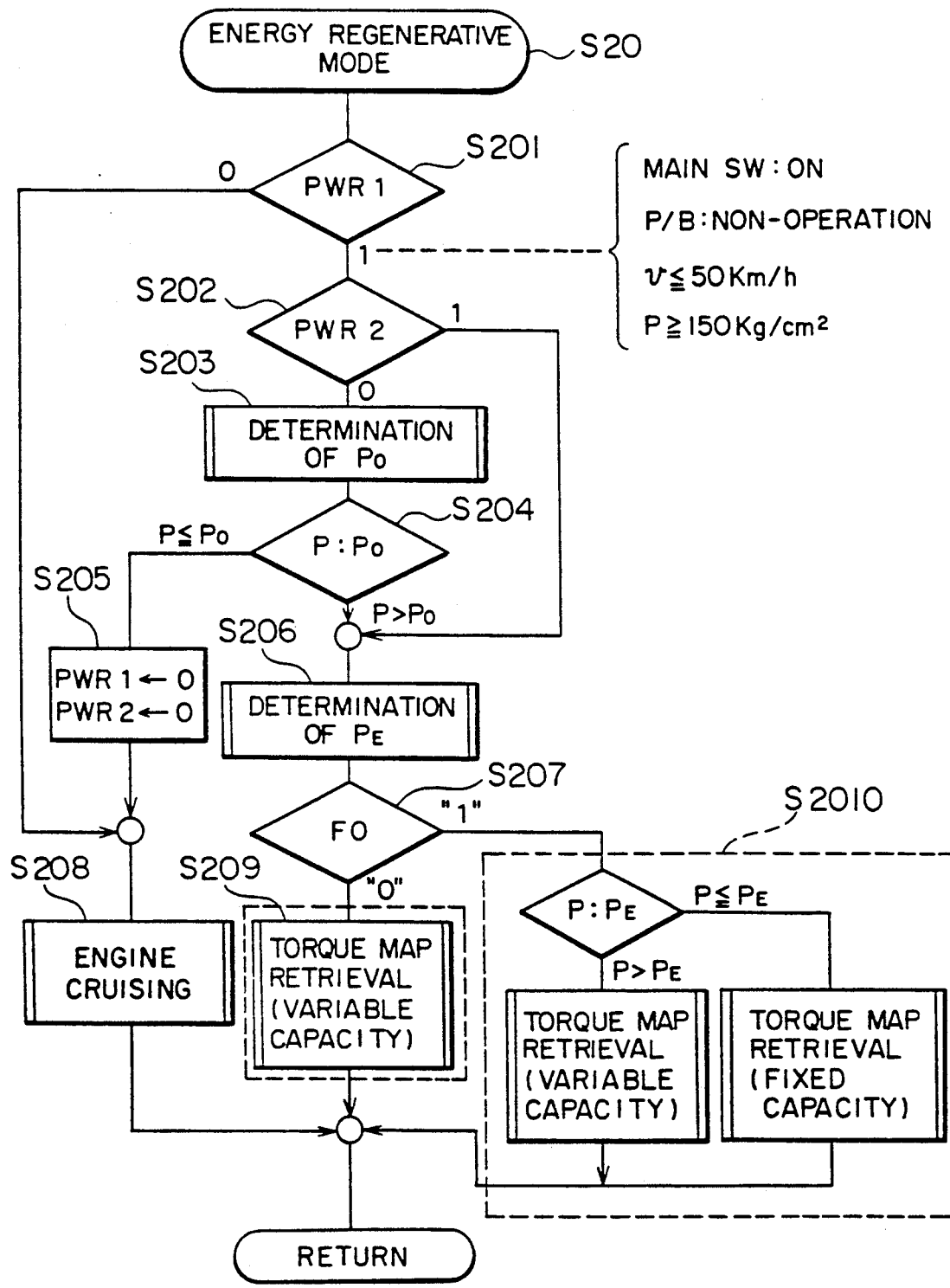
FIG. 4 is a flow chart of an energy regenerative mode subroutine.
Figure 5:
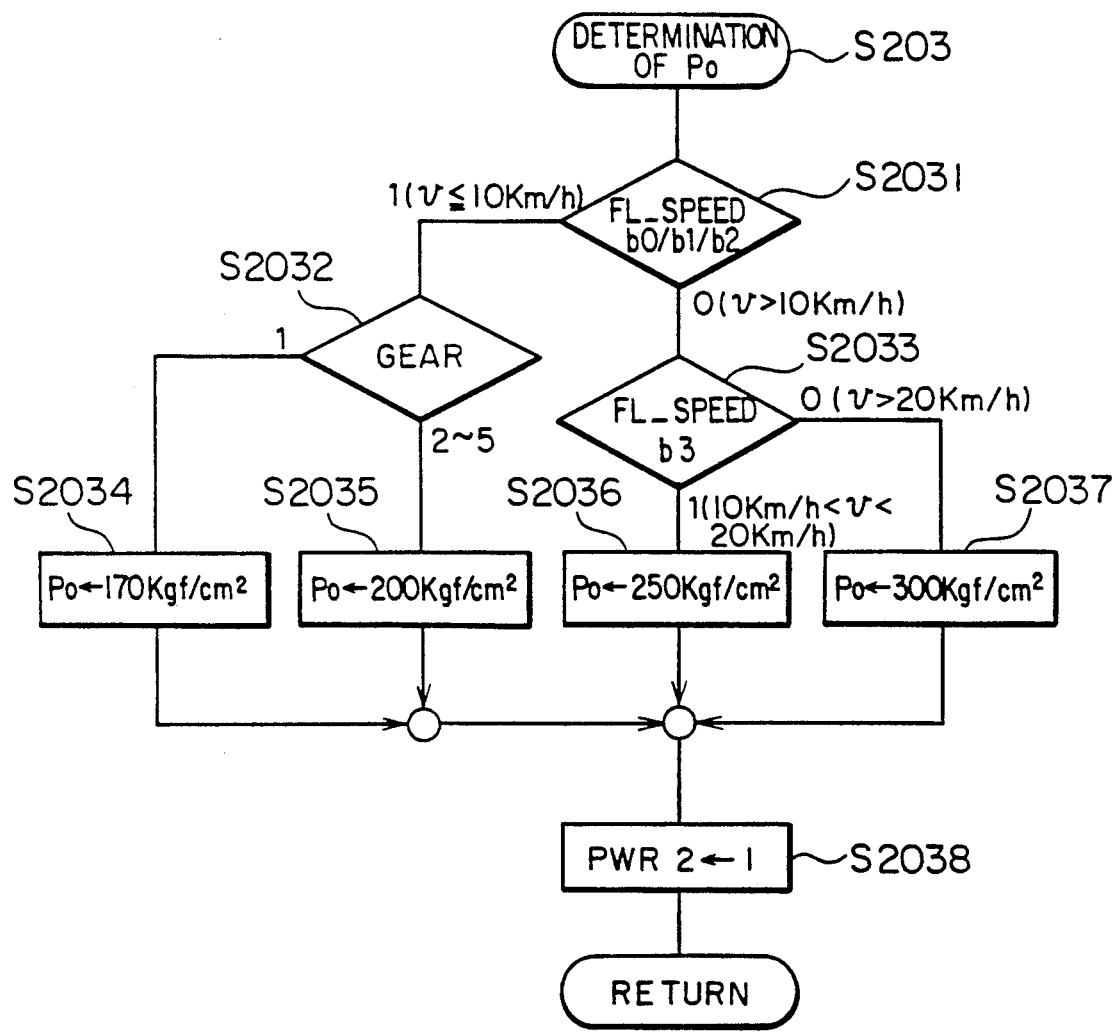
FIG. 5 is a flow chart of a $P_O$ determination subroutine.

Namely, in either of exhaust braking or engine braking, the substitute power will be produced under the control of the output of the hand lever 48 unless the acceleration pedal 54 is operated. In other words, if the car cruises at a predetermined speed (e.g. 10 km/h or 2 km/h as shown in FIGS. 4 and 5) or more even when braking power is determined and generated, through step S21 and the followings, corresponding to the position of the brake pedal in step S174, braking torque equivalent to the exhaust braking or engine braking will be further determined and additionally generated.

Of course, if the car has the idle condition, the program will proceed to this equivalent braking torque subroutine from step S16 without passing through the subroutine in step S17.

Then, the C/U 64 executes a pump calculation subroutine (step S19, FIG. 3) which determines the capacity of the pump/motor 14 required to produce braking torque retrieved by the subroutine in steps S17, S18 according to the inner pressure of the hydraulic circuit.

Namely, if it is found that the hydraulic braking control using the pump/motor 14 in the aforementioned steps S17, S18 has been carried out, respective braking torque retrieved in each of subroutines S17, S18 is integrated (step S192) to obtain overall braking torque required for the pump/motor 14.

Then, the capacity $V_P$ of the pump/motor 14 is determined according to the following theoretical Equation (1) by using the torque T for the pump/motor 14 obtained from the necessary overall braking torque divided by the gear ratio of the final gear and the PTO unit.

$$V_P = 200\pi T/P \quad (1)$$

where
P: Inner oil pressure of hydraulic circuit detected by pressure sensor 47 (kg/cm$^2$),
$V_P$: Capacity of pump/motor (cc),
T: Required braking torque (kg/m).

This invention can utilize the pump/motor 14 of a swash shaft piston type or a swash plate piston type, so that the capacity $V_P$ is controlled by varying the displacement (incline) angle of the swash shaft (plate).

Returning to step S16 of the main program in FIG. 3, when the accelerator pedal 54 is operated by the foot, the C/U 64 executes an energy regenerative mode subroutine, in which deceleration energy as accumulated in the high pressure accumulator 26, is utilized for cruising the car (FIG. 3, step S20).

In this subroutine, it is at first checked in step S201 in FIG. 4) whether the bit 4 of the flag FL-RBS (flag PWR1 shown in FIG. 13) is set to "1" or reset to "0", namely whether or not the car can cruise with hydraulic power.

It is to be noted that the case where the car can cruise with hydraulic power occurs when the following conditions are fully satisfied; ① when the RBS main switch 53 is on, ② when the parking brake lever 51 is not operated by the hand, ③ when the car speed is below a predetermined speed (e.g. 50 km/h) corresponding to the permissible rotational speed of the pump/motor 14, ④ the inner pressure of the high pressure accumulator 26 is above the minimum operating pressure (e.g. 150 kgf/cm$^2$). If any one of the conditions ①~④ is not satisfied, the flag PWR1 is reset. Also, as in step S205 which will be later described, the flag PWR1 is reset when the car can not cruise with hydraulic power.

Therefore, the flag PWR1 is set to "1" when the above conditions ①~④ are fully satisfied and the hydraulic braking control is utilized, because even if the conditions ①~④ are fully satisfied, if the hydraulic braking control is utilized after it is found that the hydraulic cruising is impossible, the inner pressure of the high pressure accumulator is expectedly increased to enable the car to cruise with the hydraulic power.

If it is found in step S201 that the flag PWR=0, the subroutine proceeds with the engine cruising subroutine in step S208 where the hydraulic circuit is decided to be turned off and the positional signal of the acceleration pedal 54 is processed for the step motor 3.

In step S201, if it is found that the flag PWR1=1, it will be checked whether or not the car has already performed the hydraulic cruising (step S202). If the bit 5 (PWR2) of the flag FL-RBS is "0", it means that the hydraulic cruising has not yet started, while if PWR2=1, it means that the hydraulic cruising has already started, so that the program proceeds to step S206 with skipping steps S203, S204.

If it is found in step S202 that the flag PWR2=0, it will be necessary to check whether or not the hydraulic cruising can be started.

The condition for enabling the hydraulic cruising to be started is that the pressure P accumulated in the high pressure accumulator 26 is above reference pressure $P_O$ in consideration of car speed and gear position. It is to be noted that the reason why the determination of $P_O$ should consider the car speed is that the hydraulic pressure can be increased due to the braking operation even during cruising, thereby to satisfy the conditions PWR1=1 and PWR2=0.

Therefore, the program executes a determination subroutine of initial pressure $P_O$ (step S203). Starting this subroutine, the C/U 64 at first checks whether or not the car speed at the moment is a low speed (e.g. 10 km/h) (step S2031 in FIG. 5), where if the answer is yes, it checks the gear position selected at the moment from the output of the gear position sensor 38 (step S2032).

If it is found that the gear position is the 1st gear, the initial pressure $P_O$ will be set at, e.g., 170 kgf/cm$^2$ (step S2034) which is selected from the fact that the car speed is minute at the 1st gear position, so that the reduction of the oil pressure is little.

When the selected gear position is one of the 2nd to 5th, the initial pressure $P_O$ is set at 200 kgf/cm$^2$. However, since the gear position is automatically determined in accordance with the car speed and the position of the accelerator pedal 54, the 4th and 5th gears are not actually be used.

If it is found in step S2031 that the car speed is above such a low speed, the speed area will then be checked from the bit 3 of the flag FL-SPEED (step S2033).

Namely, if the car speed v assumes that 10 km/h<v≦20 km/h, the initial pressure $P_O$=250 kgf/cm$^2$ will be set (step S2036), while if the car speed exceeds 20 km/h, the initial pressure $P_O$=300 kgf/cm$^2$ (step S2036) will be set.

Namely, the higher the car speed, the higher the initial pressure $P_O$ should be set because the increase of the car speed leads to a rapid reduction of the oil pressure.

Additionally, the initial pressure $P_O$ may be set from a matrix of the capacity and the rotational speed of the pump/motor 14, which cause the pressure reduction.

After having set the initial pressure $P_O$, the program returns to the energy regenerative mode subroutine with the flag PWR2=1 (step S2038).

The initial pressure $P_O$ as set in step S203 is compared with the pressure P accumulated in the high pressure accumulator 26 (step S204 in FIG. 4). If $P \leq P_O$, the hydraulic cruising will not be done because of the shortage of the oil pressure. At this time, the flags PWR1 and PWR2 are reset (step S205), whereby the car cruises only with the engine power.

This comparison will be skipped by step S202 as stated above after the hydraulic cruising has been started.

If it is found in step S204 that $P > P_O$, which enables the car to start with the hydraulic power, the C/U 64 will excecute a subroutine for the determination of fade-out start pressure $P_E$ during the hydraulic cruising (step S206).

This subroutine presses hydraulic driving torque according to the reduction of the oil pressure with the motoring capacity of the pump/motor 14 being fixed, raises the rotational speed of the engine, and increases engine torque. This is done for a smooth change-over from the hydraulic cruising to the engine cruising.

Figure 6:
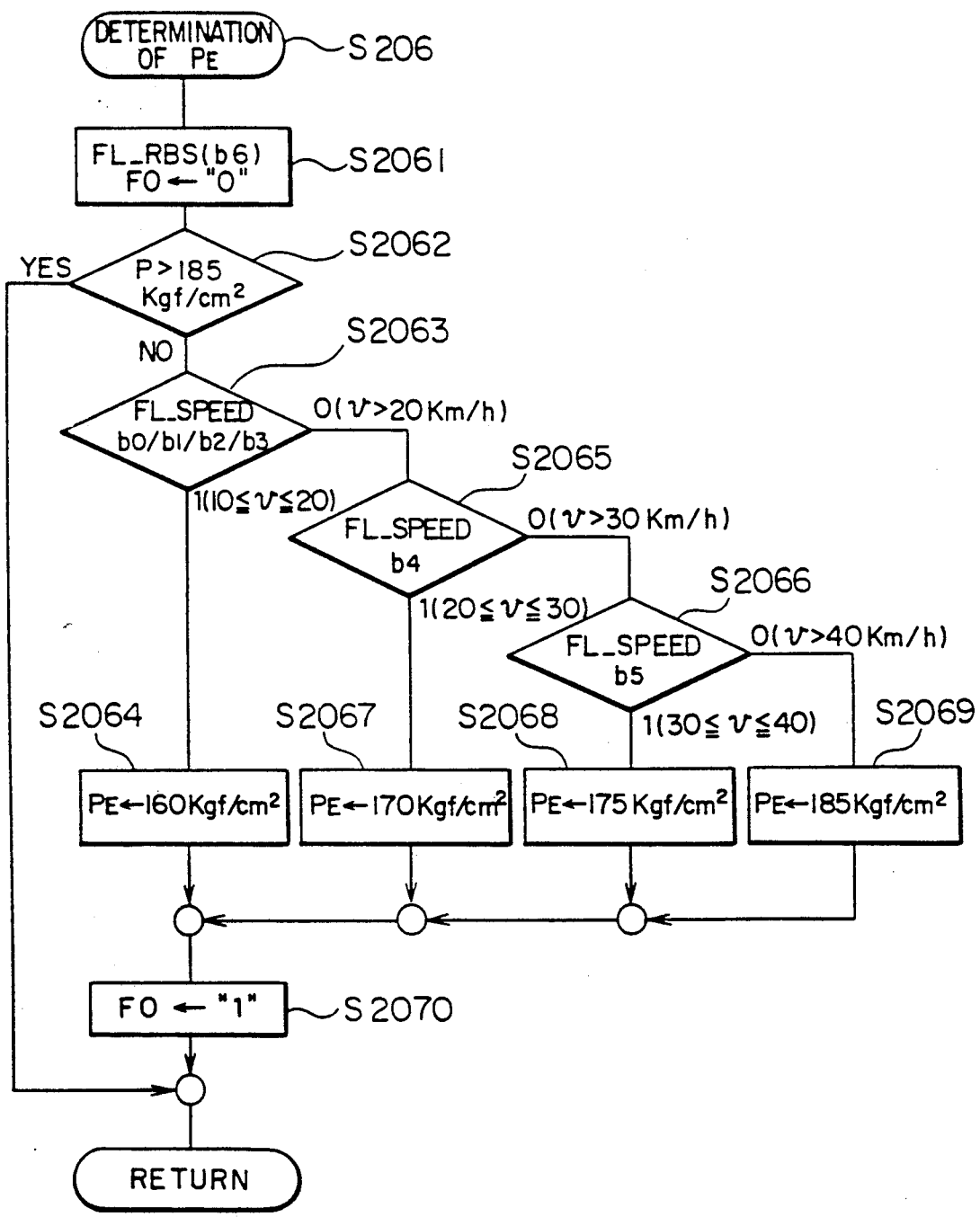
FIG. 6 is a flow chart of a $P_E$ determination subroutie.

Starting this subroutine, the program resets the bit F0 of the flag FL-RBS (step S2061 in FIG. 6).

Next, the pressure P of the high pressure accumulator 26 is checked in step 2062. If $P > 185$ kgf/cm$^2$ for example, the fade-out start pressure $P_E$ will not be set, while if the pressure P is decreased so that $P \leq 185$ kgf/cm$^2$, the pressure $P_E$ will be set corresponding to the car speed.

Namely, if it is found in step S2063 that the car speed is low (e.g. below 20 km/h) from the bits 0~3 of the flag FL-SPEED, the start pressure $P_E$ will be set with e.g. 160 kgf/cm$^2$ (step S2064).

Similarly, if it is found from the bit 4 of the flag FL-SPEED that the car speed is between e.g. 20 km/h and 30 km/h (step S2065), it is set that $P_E = 170$ kgf/cm$^2$ (step S2066), while if the car speed is between 30 km/h and 40 km/h (step S2067), it is set that $P_E = 175$ kgf/cm$^2$ (step S2068). If the car speed is above 40 km/h, it is set that $P_E = 185$ kgf/cm$^2$ (step S2069). Then, the flag F0 is set for the fade-out start (step S2070), while the program returns to the energy regenerative subroutine.

In FIG. 4, the flag F0 is checked in step S207, where if it is "0", a retrieval subroutine for torque map will be executed in step S209, where the motoring capacity of the pump motor 14 is determined from the pressure P, the gear position, and the position of the acclerator pedal 54.

Figure 8:
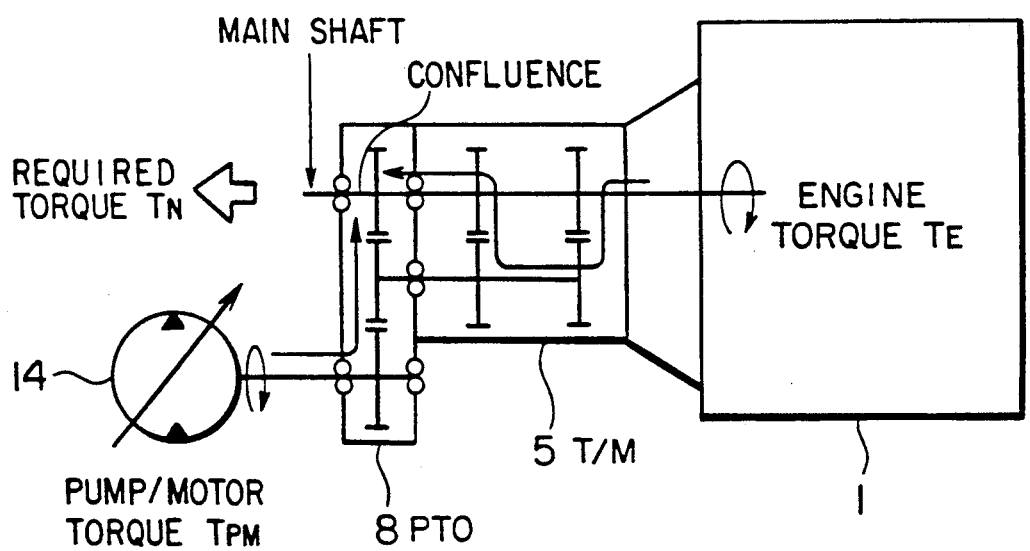
FIG. 8 is a diagram illustrating the confluence of engine torque and pump/motor torque.

In this subroutine, as shown in FIG. 8, the confluence of the output of the engine 1 and the output of the pump/motor 14 is positioned on the main shaft, so that the control is based on the torque value on the main shaft.

In FIG. 8, torque $T_N$ required on the main shaft is determined from the following Equation (2), $$T_N = T_{PM} \times PTO \text{ gear ratio} + T_E \times T/M \text{ gear ratio} \quad (2)$$

where $T_{PM}$: Torque of the pump/motor 14,
$T_E$: Torque of the engine 1.

Also in FIG. 8, the required torque $T_N$ on the main shaft is set with the maximum value per each gear position, this maximum value corresponding to the maximum value of the position of the accelerator pedal 54. When the gear is shifted according to the car speed and the position of the accelerator pedal 54, as shown in FIG. 15, the required torque is altered according to the gear position.

Figure 9:
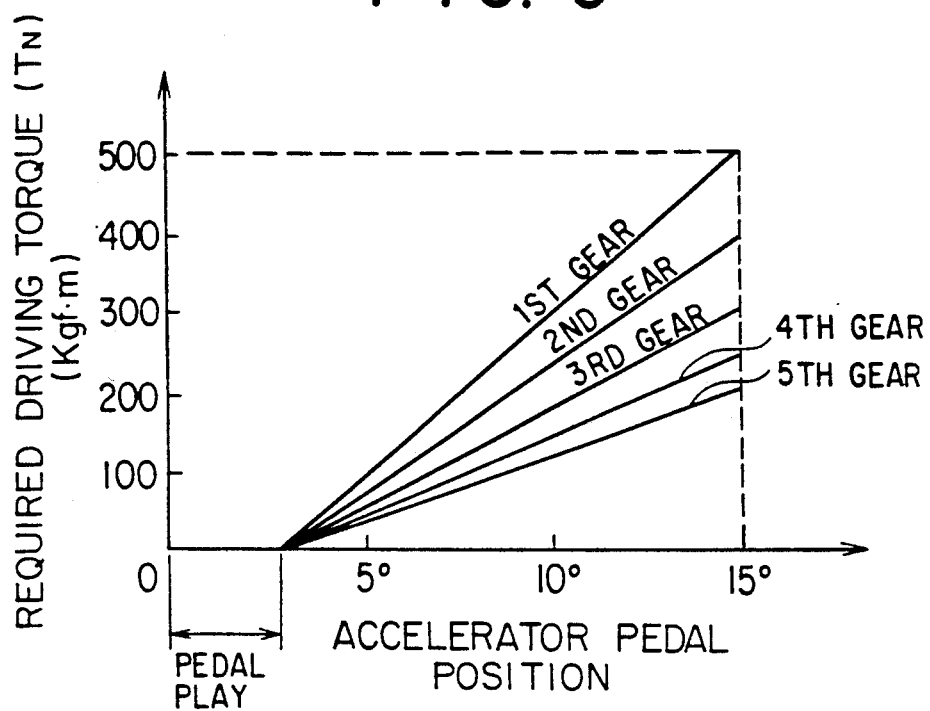
FIG. 9 is a driving torque map for a pump/motor in response to accelerator pedal position per each gear position.

FIG. 9 shows a map for the required torque $T_N$ derived from Equation (2), in which the maximum value of the required torque $T_N$ varies with each gear position because only the gear ratio of the T/M 5 is variable.

From this map, the required torque $T_N$ is retrieved according to the position of the accelerator pedal 54 at the present gear position detected by the sensors 38, 39.

Figure 10:
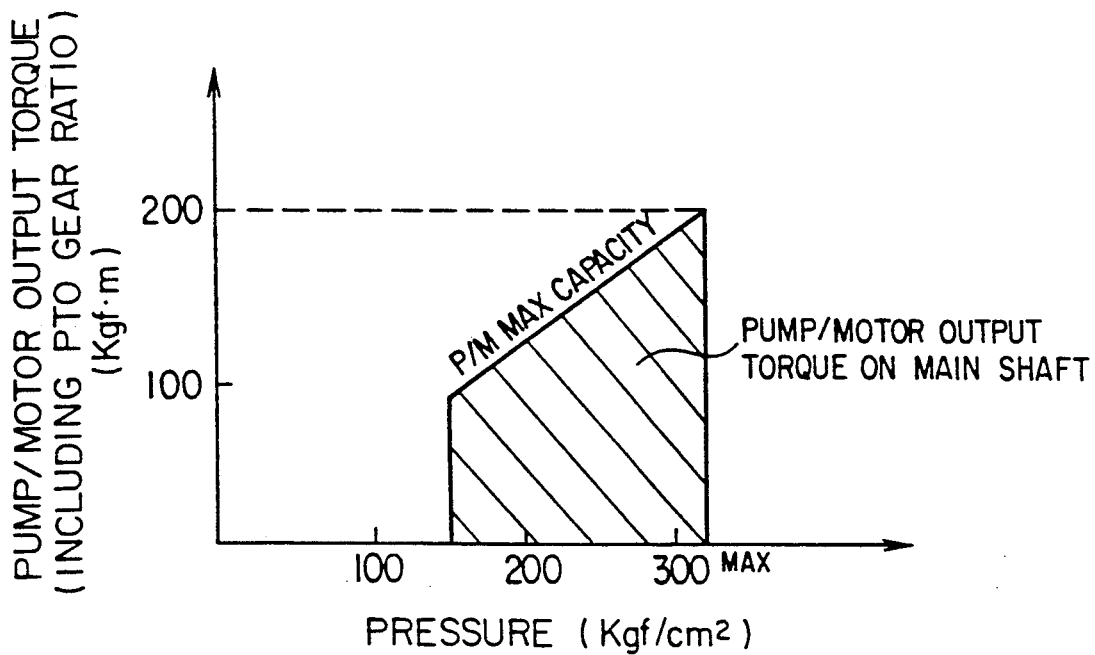
FIG. 10 is a pump/motor output torque map in response to oil pressure.
Figure 11:
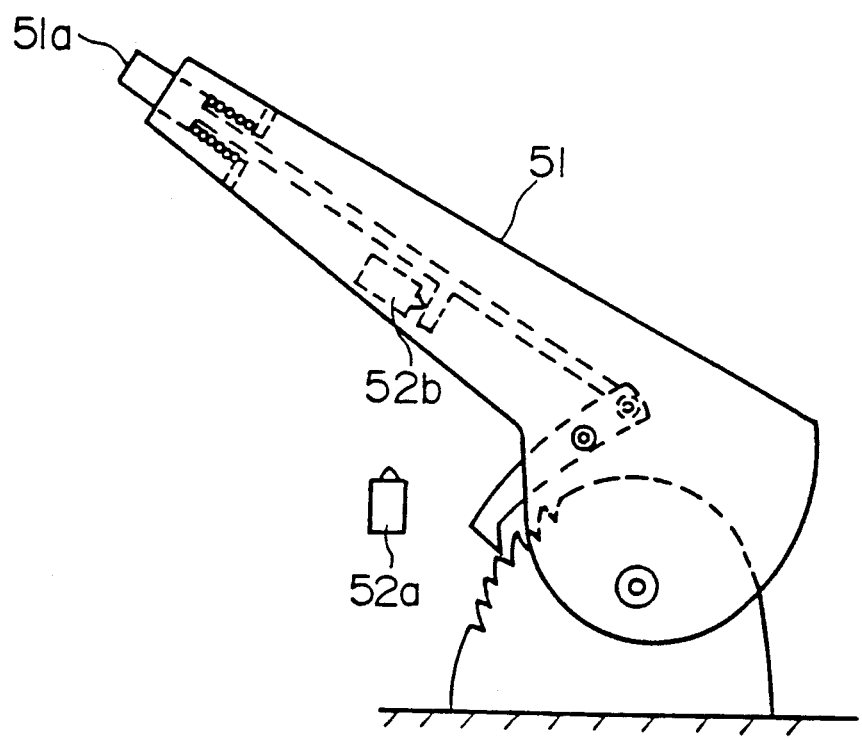
FIG. 11 is an outline diagram for explaining a parking brake lever.

FIG. 10 shows a map of output torque ($T_{PM} \times$ PTO gear ratio) on the main shaft of the pump/motor 14. By using this map together with the map of FIG. 9, the capacity required for the pump/motor 14 can be determined.

Namely, if the required torque $T_N$ is below the maximum output torque of the pump/motor 14 at the maximum capacity thereof, the motoring capacity will be determined from the torque $T_N$, while if the required torque $T_N$ exceeds the maximum output torque of the pump/motor 14, the motoring capacity will be determined from the maximum output torque where the pump/motor 14 has the maximum capacity. The remainder (i.e., the short torque) of the required torque $T_N$ will be provided by the engine output.

Returning to FIG. 4, in step S207, the condition that the flag F0 is "0" means that $P_E$ has been set and the fade-out control is executed or is about to be executed in step S2010.

Namely, the present pressure P is compared with the set pressure $P_E$, where if $P > P_E$, the fade-out control is about to be executed, but not yet executed, while the motoring capacity of the pump/motor 14 is determined in the same manner as step S209.

If $P \leq P_E$, the motoring capacity of the pump/motor 14 is fixed at the value at the time when the program has proceeded to the fade-out control (step S207) for the execution thereof, whereby a gradual reduction of the pressure P will cause the reduction of the torque T according to Equation (1). Therefore, as in step S209, the short torque (see FIG. 10) caused by the retrieval of the required torque $T_E$ corresponding to the position of the accelerator pedal from the map of FIG. 9 is provided by the engine output. Therefore, the hydraulic driving power is gradually decreased, that is faded out, while the engine driving power is gradually increased.

It is to be noted that to supplement the short torque with the engine, the relationship between torque and the movement of the step motor for driving a fuel injection governor may be determined per gear position.

Again, the main program in FIG. 3 executes the conventional brake control mode subroutine, as above noted, of step S22, in which mode only air braking or air oil braking is effected, without hydraulic pressure.

After the above various controls, the C/U 64 performs an oil content control subroutine (FIG. 3, step S21). In this subroutine, whether or not oil replenishment is necessary is checked depending on whether the oil content detection limit switch 45 is on or off to generate operation requests for the electromagnetic valve 31, 32.

Also, the C/U 64, as in well-known Japanese Patent Application laid-open No. 60-11769, reads a car speed signal from the car speed sensor 54, an acceleration signal corresponding to the foot position of the accelerator pedal 54 from the acceleration opening sensor 56, and a selection signal (matrix signal) from the gear selection lever 54, and selects an optimum gear position of the T/M 5 on the basis of the map shown in FIG. 15 prepared according to the car speed and the position of the acceleration pedal 54 (FIG. 3, steps S23 and S24).

This is accomplished by driving the clutch actuator 7 and the gear shift actuator 6 to decouple the engine clutch (not shown), by neutralizing the gear of the T/M 5, by selecting and shifting the gear to couple the engine clutch, whereby the gear position of the T/M 5 is automatically shifted up/down to a suitable one in accordance with the car speed and the position of the accelerator pedal 54.

Through the determination in the various subroutines as noted above, the C/U 64 actually controls the various components of the car.

Figure 7:
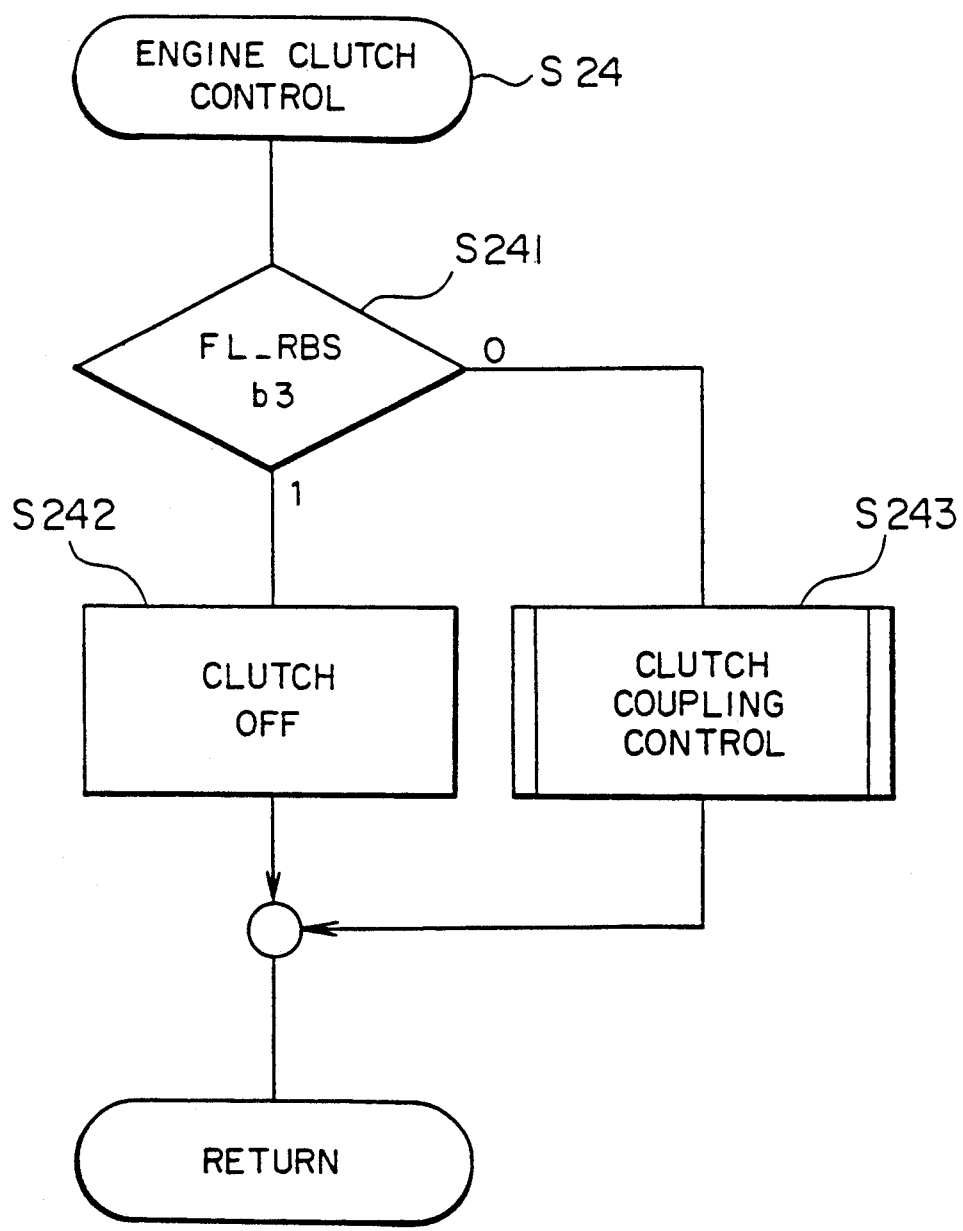
FIG. 7 is a flow chart of a clutch control subroutine.

Namely, the C/U 64 declutches the engine 1 on the basis of a determining subroutine for a clutch control method shown in FIG. 7 if the bit 3 of the flag FL-RBS is "1" (FIG. 8, step S241) only for the hydraulic cruising (step S242). The bit 3 of the flag F1-RBS is, as shown in FIG. 13, set necessarily in the energy recovery mode in step S17 and is set in case where the car cruises only with hydraulic pressure in the energy regenerative mode in step S20.

It is to be noted that an automatically clutched auto-transmission car is already known for coupling/decoupling the engine clutch while even a car without the auto-transmission may be used with only the engine clutch being automatically coupled/decoupled. Furthermore, in case of a fluid type auto-transmission car, the decoupling of the engine is similarly effected with the gear being controlled at the neutral.

Subsequently, in accordance with the capacity of the pump/motor 14, the connection/disconnection of the electromagnetic clutch 13, and the switching position of the circuit switching valve 25 that have already been determined in the above-mentioned energy recovery mode, regenerative mode, conventional brake control mode etc., the program executes a hydraulic circuit control subroutine for actually driving these components.

This hydraulic circuit control subroutine actually controls the circuit switching valve 25, the pump/motor 14, and the electromagnetic clutch 13 forming the hydraulic circuit on the basis of the above noted various judgements and calculated results.

After the hydraulic circuit control (step S25), the program executes an idle control subroutine in which the C/U 64 reads the signals from the directly linked cooling relay switch 33 and the water temperature sensor 34 to stabilize the idling rotation during cooling in the idling mode of the engine 1 and also to stabilize the idling rotation in the driving mode of the replenishing pump 30 (step S26).

Then, the target position of the step motor 3 for fuel injection is set according to the output torque of the engine 1 determined in the above energy regenerative mode etc. to execute an engine control subroutine (step S27).

In this case, the engine 1 is controlled at an idling mode when the capacity of the pump/motor 14 determined in the above energy regenerative mode etc is lower than 250 cc (V<250 cc), and is controlled to produce a necessary output determined from the following Equation (3) when V>250 cc.

$$\text{Engine output required} = ((T/M \text{ output required}) - \\ (\text{maximum output of pump/motor})) \times \\ (PTO \text{ gear ratio})/(T/M \text{ gear ratio}) \quad (3)$$

This engine output is obtained by a fuel injection governor driven by the step motor after the conversion into the position of the accelerator pedal.

After the aforementioned control and processing, an indicator control subroutine is executed which includes indications for the hydraulic pressure and power source (oil pressure, engine) and controls the indications of the indicators 63 (step S28).

An HSA control subroutine is executed to close HSA valve 72 to retain the braking condition under the condition that the car speed is stopped and the brake pedal 57 is operated, and which relieves the braking condition under the condition that the accelerator pedal 54 is operated by the foot, or the gear selection lever 60 is positioned at neutral (step S29).

After this, the program checks whether or not the timing for the execution of self diagnoses has elapsed (step S30), and when the timing lapses such self diagnoses is periodically (e.g. 500 ms) executed (step S31). After a waiting time for making the processing time fixed (step S32), the program returns to step S2 for the repetition of the above processing.

It is to be noted that the above subroutines (step S23~31) may be applied with presently known art.

We claim:

1. A regenerative braking system for a car having an accelerator pedal power take-off unit, an engine and a transmission gear, comprising:
  a hydraulic oil circuit formed of:
    a high pressure accumulator;
    a pump/motor having a maximum motoring capacity;
    a circuit valve coupled to said pump/motor and said high pressure accumulator; and
    a low pressure accumulator coupled to said circuit valve;
  an electromagnetic clutch, coupled to said pump/motor, for connecting or disconnecting said pump/motor to or from the power take-off unit;
  means for sensing the position of the accelerator pedal;
  means for sensing the pressure of said hydraulic oil circuit;
  means for sensing the position of the transmission gear;
  means for sensing the speed of the car;
  control means for automatically controlling the position of the transmission gear based on the sensed position of the accelerator pedal and the sensed car speed, for determining a driving torque required for the car according to the sensed position of the accelerator pedal and the sensed position of the transmission gear, and for determining the motoring capacity of said pump/motor based on the determined driving torque and the sensed pressure of said hydraulic oil circuit, said control means coupling the engine of the car and said electromagnetic clutch, and closing said hydraulic oil circuit in which said pump/motor is controlled to have the maximum motoring capacity, the engine being controlled to have the output for providing a supplemental torque when the determined driving torque exceeds the maximum motoring capacity in an accelerating mode of the car.

2. A regenerative braking system for a car according to claim 1, wherein said control means includes therein a stored map for defining the relationship between the position of the accelerator pedal and driving torque per each transmission gear position.

3. A regenerative braking system for a car according to claim 2, wherein said control means calculate the motoring capacity of said pump/motor by using the following Equation, $$V_P = 200\pi T/P$$

where $V_P$ indicates the motoring capacity, T indicates the required driving torque, and P indicates the sensed pressure of said hydraulic oil circuit.

4. A regenerative braking system for a car according to claim 3, wherein said pump/motor is of a swash plate type and wherein said control means controls the displacement angle of said pump/motor to have the determined motoring capacity.

5. A regenerative braking system for a car according to claim 1, wherein said control means switches over said circuit valve so that said hydraulic oil circuit may have therein the hydraulic flow from said high pressure accumulator to said low pressure accumulator.

6. A regenerative braking system for a car according to claim 1, wherein the car has an engine clutch and wherein said control means controls the engine clutch to decouple the engine.

7. A regenerative braking system for a car having an accelerator pedal power take-off unit, an engine and a transmission gear, comprising:

a hydraulic oil circuit;

an electromagnetic clutch, coupled to said hydraulic oil circuit, for connecting or disconnecting said hydraulic oil circuit to or from the power take-off unit;

means for sensing the position of the accelerator pedal;

means for sensing the pressure of said hydraulic oil circuit;

means for sensing the position of the transmission gear;

means for sensing the speed of the car; and control means for automatically controlling the position of the transmission gear based on the sensed position of the accelerator pedal and the sensed car speed, for determining a driving torque required for the car according to the sensed position of the accelerator pedal and the sensed position of the transmission gear, and for determining the motoring capacity of said hydraulic oil circuit based on the determined driving torque and the sensed pressure of said hydraulic oil circuit, said control means coupling the engine of the car and said electromagnetic clutch, and closing said hydraulic oil circuit which is controlled to have the maximum motoring capacity, the engine being controlled to have the output for providing a supplemental torque when the determined driving torque exceeds the maximum motoring capacity in an accelerating mode of the car.

* * * * *